No. 664,312. Patented Dec. 18, 1900.
C. M. CARNAHAN.
CAR TRUCK.
(Application filed Apr. 17, 1900.)
(No Model.) 2 Sheets—Sheet 1.
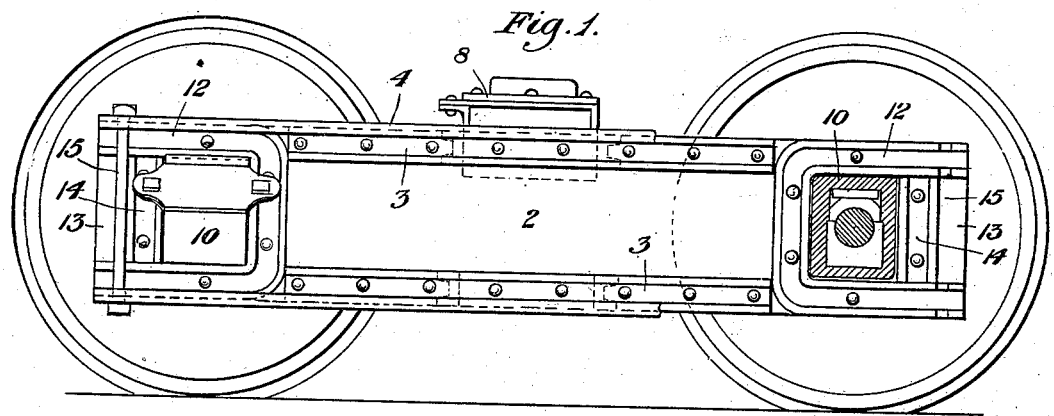
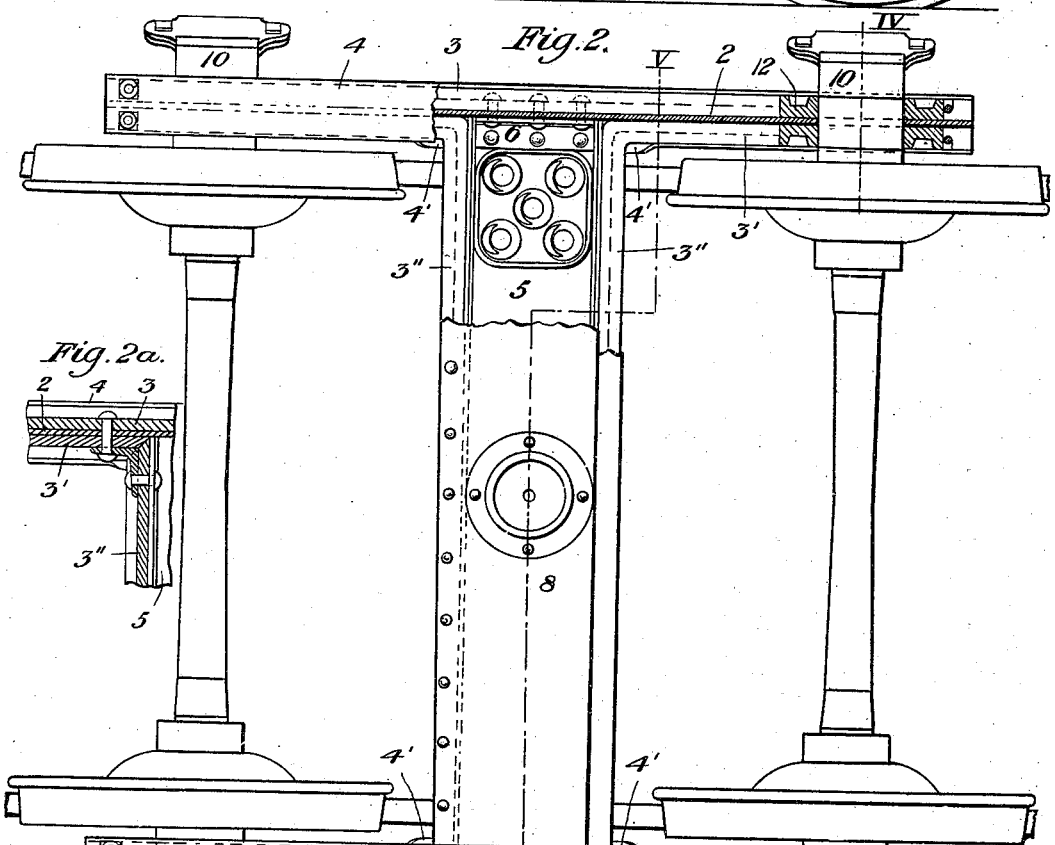

No. 664,312. Patented Dec. 18, 1900.
C. M. CARNAHAN.
CAR TRUCK.
(Application filed Apr. 17, 1900.)
(No Model.) 2 Sheets—Sheet 2.
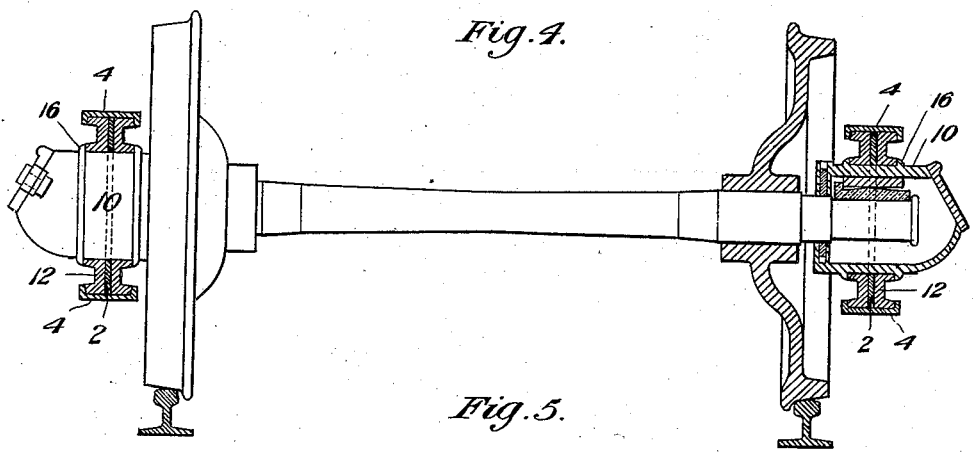
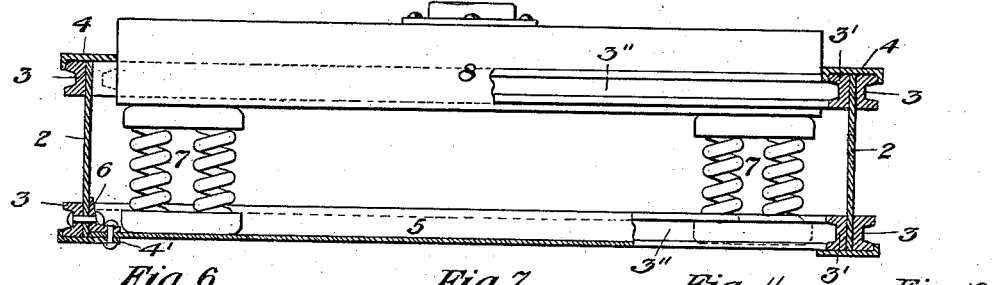
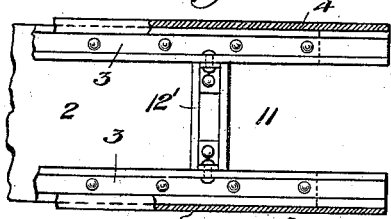
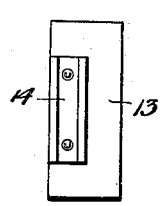
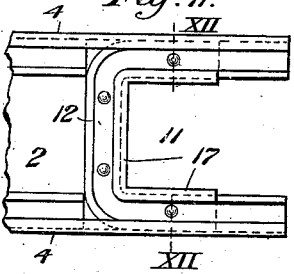
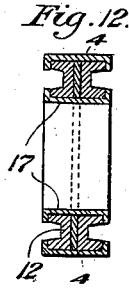
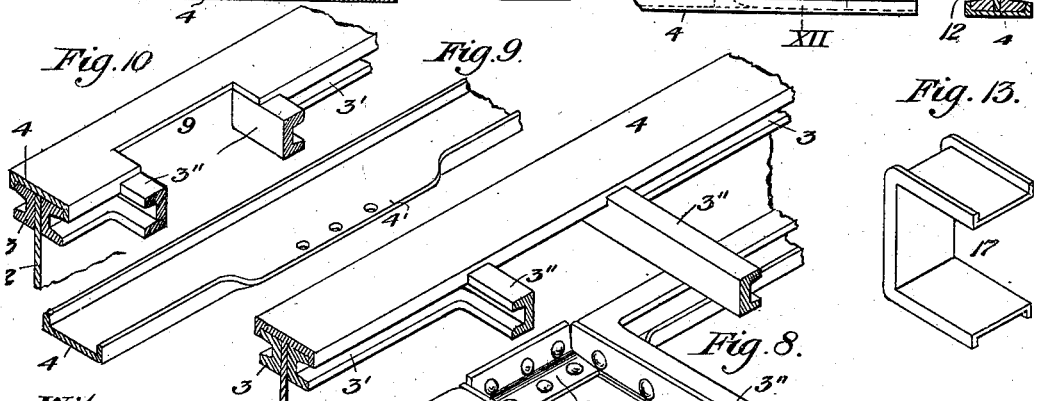
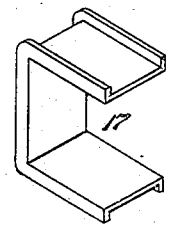
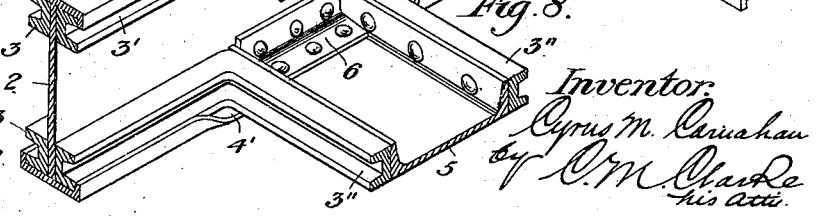
Witnesses: Inventor:
Cyrus M. Carnahan
by C. M. Clarke
his atty.
THE NORRIS PETERS CO., PHOTO-LITHO., WASHINGTON, D. C.

UNITED STATES PATENT OFFICE.

CYRUS M. CARNAHAN, OF ALLEGHENY, PENNSYLVANIA.

CAR-TRUCK.

SPECIFICATION forming part of Letters Patent No. 664,312, dated December 18, 1900.

Application filed April 17, 1900. Serial No. 13,174. (No model.)

*To all whom it may concern:*

Be it known that I, CYRUS M. CARNAHAN, a citizen of the United States, residing at Allegheny, in the county of Allegheny and State of Pennsylvania, have invented certain new and useful Improvements in Car-Trucks, of which the following is a specification, reference being had to the accompanying drawings, forming part of this specification, in which—

Figure 1 is a side elevation, partly in section, of my improved car-truck. Fig. 2 is a plan view, partly in section. Fig. 2ª is a sectional detail view illustrating a modified construction of joint connecting the longitudinal members with the transverse member. Fig. 3 is a sectional detail view of the middle upper cross-frame joint. Fig. 4 is a transverse cross-section on the line IV IV of Fig. 2. Fig. 5 is a similar section on the line V V of Fig. 2. Fig. 6 is a partial view of one of the side members, showing a modified construction, the front reinforcing-section being removed. Fig. 7 is a detail side view of the front reinforcing-section. Fig. 8 is a perspective detail view illustrating the framing of the middle cross members with the side member. Fig. 9 is a perspective detail view of the middle portion of the lower reinforcing member. Fig. 10 is a partial perspective detail view similar to Fig. 8, showing a modified construction wherein the upper reinforcing member is cut out to provide clearance for the bolster. Fig. 11 is a view similar to Fig. 6, but illustrating a further modification employing an additional reinforcing inner frame. Fig. 12 is a cross-sectional detail view taken on the line XII XII of Fig. 11. Fig. 13 is a perspective detail view of the inner reinforcing frame or filler.

My invention refers to the class of car-trucks, more especially of trucks composed entirely of metal; and it consists of the novel construction and arrangement of the parts, as shall be more fully hereinafter set forth.

Referring to the drawings, the side members of the truck are composed of a central plate 2, forming its body portion and of approximately the full length. On the outside at top and bottom the plate is reinforced by longitudinal rolled members, as channels 3, while on the inner side are corresponding upper and lower reinforcing members 3', which at the middle of the truck are continued across from one side member to the other, separated by a central transverse space of the width of the bolster for which these cross members 3" form upper and lower bearings. They also serve to rigidly connect the side members and act as stiffening-braces, being strongly riveted through the plate and the reinforcing members on each side of it. Above and below the reinforcing members are reinforcing-channels 4, the flanges of which embrace the edges of the reinforcing upper and lower members to which they are securely riveted.

Transversely arranged across the middle of the truck, between the lower cross members 3", to which it is riveted, is a channel 5, the ends of which abut against the inner sides of the plate 2 and rest even with its lower edge upon the upper faces of the lower reinforcing-channels 4, the inner flanges 4' of which are flattened down, as shown in Figs. 5 and 9. A corner-angle 6 is riveted through the ends of channel 5 and the channel 4 and through plate 2 and reinforcing outer lower channel 3', thus firmly incorporating the parts together. The inner lower reinforcing members may also continue along the under side of the plate, and the end of the channel 5 may rest upon their upper sides at each end, being riveted thereto, which construction will give good results and is contemplated as within the scope of the claims. This transverse channel 5 supports the bolster-springs 7, upon which rest the bolster 8, its sides fitting between the upper cross members 3', while the ends abut against the inner faces of the top reinforcing-channels 4. If desired, these may be cut out, as shown at 9 in Fig. 10, thus permitting of greater length of bolster and giving greater surface for the end bearings against the plates 2. It is to be noted that this construction provides ample space for passage of brake-rods, pipes, &c.

At each end of the truck are located the journal-boxes 10 for the axles, which are made of the usual or standard construction, and to permit of their insertion a rectangular opening 11 is provided at each end of each plate 2, the plate proper terminating at the outer extremities of such opening. Surrounding the inner, upper, and lower sides of the opening and projecting somewhat beyond it are U-shaped reinforcing-frames 12, of channel or angle shape, laid flat against the inner and outer faces of the plate to which the frames are securely riveted, as shown, the frames fitting up under and down against the inside faces of reinforcing-channels 4 and flush with the upper and lower edges of the plate 2 and forming with it a practically homogeneous construction. As thus constructed the reinforcing members 12 may be made to fit in between the retaining-lugs 16 of the journal-boxes, the upper and lower reinforcing members being somewhat wider. When it is desired, however, to utilize the full width of the side truck for the journal-box bearing, the frame 12 may be further reinforced and widened to any desired degree by a filler 17, which may be made of a channel, as shown, or of angles or flat plates either in one piece turned at the corners, as shown, or of separate straight pieces, which may be secured to the main structure in any suitable manner. This feature is of advantage in adapting uniform or standard sizes of truck to varying width or sizes of journal-boxes, and it will be further understood that the filler may be applied to all or any of the edges of the aperture, as required, and secured in place or made removable, as desired. The upper and lower reinforcing-channels 4 4 extend somewhat beyond the termination of the plates, and between these projecting ends of the plates is embraced a short section of plate 13, corresponding in depth to the main plate 2 and forming, in effect, an extension of it. On the inner side, adjacent to the opening 11, this section is provided with a reinforcing frame, channel, or angle members 14, riveted to the plate-section and adapted to fit between the upper and lower extensions of the frame 12, thus completing the rectangular reinforcement of the journal-box housing. This end section 13 is held in position by bolts 15 on one or both sides, fitting into recesses cut in the flanges of frame member 12, passing through the channels 4 4, and firmly screwed up tight by a nut on the end of each bolt. These bolts may be located immediately behind the members 14 or between the flanges thereof, so as to insure engagement and hold the sections securely in place.

In Fig. 6 I have shown a construction in which the upper and lower reinforcing-channels 3 are extended clear out to the ends of the plate 2, forming, in effect, the upper and lower members of the frame 12, while a vertical brace 12', set between and corresponding to the inner edge of the plate, forms the intervening member of the frame.

As thus constructed the side members of the truck from one extremity to the other are practically solid, while their strength is greatly increased by the reinforcing-frame, and the section 13 being removable permits of easy and expeditious removal of the journal-boxes and axle and their return without disturbing, mutilating, or in any way affecting the truck, it being simply necessary to jack it up sufficiently to hold it in position. This feature of removal of the boxes is a valuable one and very desirable in trucks of all classes and renders my invention peculiarly applicable to the object in view.

It will be noted that my truck is composed throughout of merchant rolled-steel shapes, such as are in common use and readily available. By reinforcing the plate as I have shown it is evident that any depth of plate required may be used, according to the load. Very little cutting or fitting is necessary, and such as is so is made by suitable punching or shearing machinery very quickly and at small cost. None of the parts are complicated or difficult to make or assemble; but, on the contrary, in addition to using shapes found already rolled the work of cutting to size and putting together, as well as the percentage of scrap, is reduced to a minimum. The weight of the car is equally distributed from the center throughout, the side members constituting trusses of great strength and rigidity. The manner of supporting and bracing the bolster assures sufficient resiliency and good bearing, while providing ample strength for the support of the load and transmission of the strain throughout the entire structure. All special or pressed shapes are avoided, castings are dispensed with, and ample opportunity is provided for attachment of brake and other connections. An especially desirable feature is the availability for bearings, as for a brake-beam, between the upper and lower flanges of the cross-brace members 3'', which are well adapted and in convenient location for such connections.

The entire truck is comparatively light in proportion to its strength, its parts are few, of simple construction, not liable to get out of order, and the whole construction is such as to enable the truck to be built by mechanics of ordinary ability in a shop having the usual appliances and tools, and when constructed as I have shown and described is exceedingly strong, durable, and well adapted to the strains, wear, and accidents to which this class of rolling-stock is peculiarly liable.

Having described my invention, what I claim is—

1. A car-truck composed of side plate members having upper and lower side and top and bottom reinforcing channel members, a middle cross member rigidly connecting the side members, supplemental cross members, constituting bolster-guides, a bolster, and reinforced journal-box housings in the ends of the side plate members, substantially as set forth.

2. A car-truck composed of side plate members having upper and lower side and top and bottom reinforcing channel members, a middle cross member rigidly connecting the side members, supplemental cross members constituting bolster-guides, formed of extensions of the upper inside reinforcing channel members, a bolster, and reinforced journal-box housings in the ends of the side plate members, substantially as set forth.

3. A car-truck composed of side plate members having upper and lower side and top and bottom reinforcing channel members, a middle cross member rigidly connecting the side members, supplemental cross members constituting bolster-guides formed of extensions of the upper inside reinforcing channel members, a bolster, reinforced journal-box housings in the ends of the side plate members, and removable end sections with means for holding them in position, substantially as set forth.

4. In a car-truck the combination of plate side members provided at each end with reinforced journal-box housings open at the outer ends, upper and lower reinforcing channel members at each side of the plate, upper and lower reinforcing channel members projecting beyond the ends of the side members, removable reinforced end sections with means for holding them in position between the upper and lower channel members, a middle cross member rigidly connecting the side members, supplemental upper cross members formed of continuations of the inner side reinforcing members and constituting bolster-guides, and a bolster mounted between the upper cross members and supported by the middle cross member, substantially as set forth.

5. In a car-truck having plate side members, a middle cross member consisting of a channel-beam abutting against the plate, a connecting-angle, and reinforcing members connected with the lower side of the plate extended to embrace and connected with the middle cross member at each side, substantially as set forth.

6. In a car-truck having plate side members, a middle cross member consisting of a channel-beam abutting against the plate, a connecting-angle, and reinforcing members connected with the lower side of the plate extended to embrace and connect with the middle cross member at each side, and lower reinforcing longitudinal channels for the side member flattened and connected with the ends of the middle cross member, substantially as set forth.

7. In a car-truck, a composite side member consisting of a plate provided with end apertures, upper and lower longitudinal reinforcing members at each side and top and bottom, longitudinal members embracing the edges of the plate and the upper and lower longitudinal side reinforcing members, substantially as set forth.

8. In a car-truck, a composite side member consisting of a plate provided with end apertures, reinforcing-frames for the apertures incorporated with the plate, upper and lower longitudinal reinforcing members at each side incorporated with the plate, and top and bottom longitudinal members embracing the edges of the plate and the upper and lower longitudinal side members, substantially as set forth.

9. In a car-truck, a composite side member consisting of a plate provided with end apertures, reinforcing-frames for the apertures incorporated with the plate, upper and lower longitudinal reinforcing members at each side incorporated with the plate, top and bottom longitudinal members embracing the edges of the plate and the upper and lower longitudinal side members, and a supplementary filler on the interior of the aperture frames, substantially as set forth.

10. In a car-truck, a composite side member consisting of a plate provided with end apertures, reinforcing-frames for the apertures incorporated with the plate, upper and lower longitudinal reinforcing members at each side incorporated with the plate, top and bottom longitudinal members embracing the edges of the plate and the upper and lower longitudinal side members, inclosing the aperture framing, and removable end sections forming outer walls for the apertures with means for securing them in position, substantially as set forth.

11. In a car-truck having plate side members: reinforcing members on the inner lower sides of the plates bent at right angles and forming rigid cross members, and a channel member incorporated with the cross portions of the reinforcing members and with the plate side members, substantially as set forth.

In testimony whereof I affix my signature in presence of two witnesses.

CYRUS M. CARNAHAN.

Witnesses:
J. F. McKENNA,
C. M. CLARKE.